Figure 1:
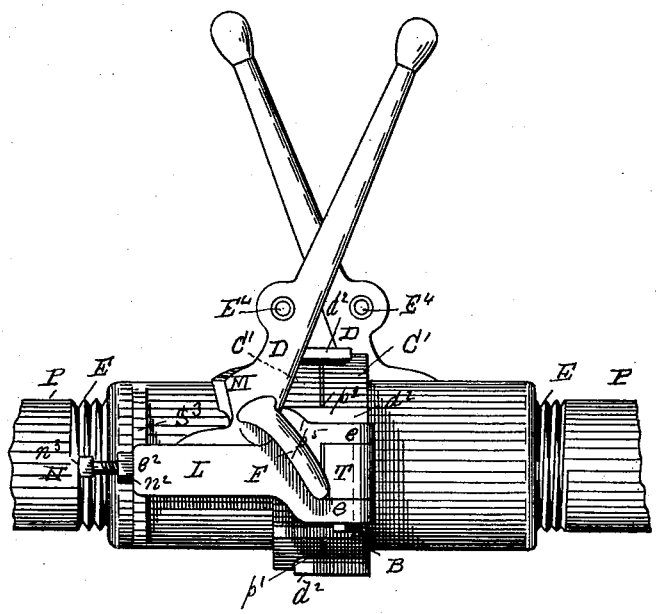

(No Model.) 3 Sheets—Sheet 1.

T. CURLEY.
STEAM PIPE COUPLING FOR RAILWAY CARS.

No. 478,991. Patented July 19, 1892.

WITNESSES
William A. Sweet
Charles S. Brintnall

INVENTOR
Thomas Curley
by W E Hagan atty (No Model.) 3 Sheets—Sheet 2.
T. CURLEY.
STEAM PIPE COUPLING FOR RAILWAY CARS.
No. 478,991. Patented July 19, 1892.
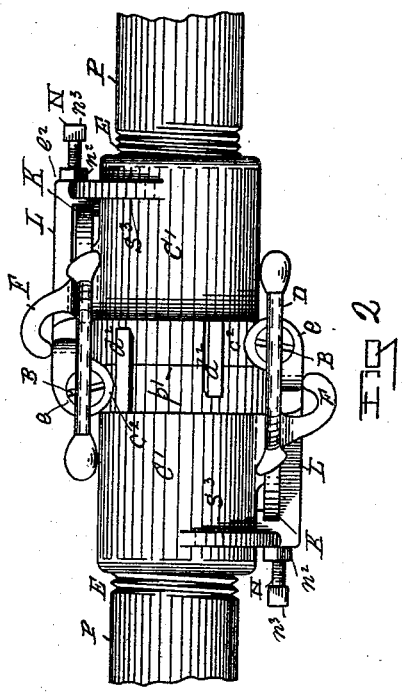
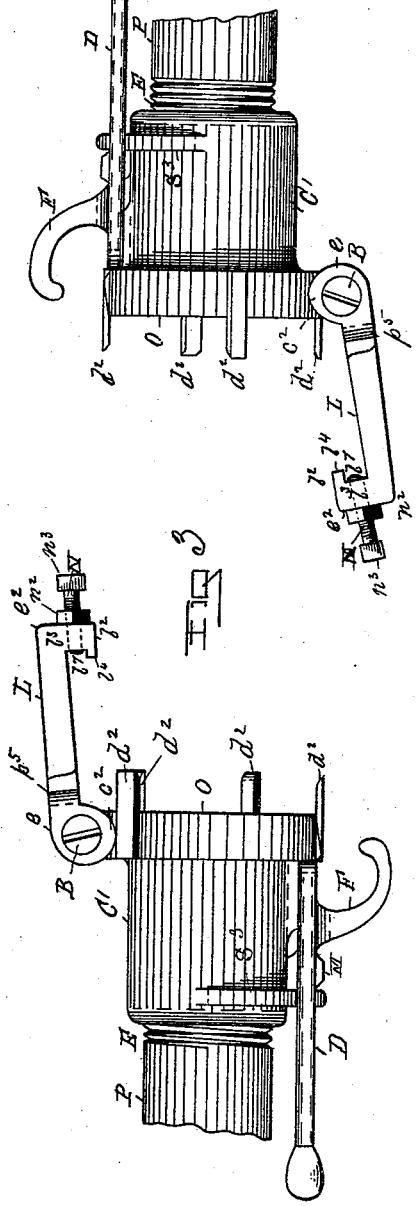
WITNESSES
William A. Livert
Charles S. Brintnall
INVENTOR
Thomas Curley
by W E Hagan atty (No Model.) 3 Sheets—Sheet 3.
T. CURLEY.
STEAM PIPE COUPLING FOR RAILWAY CARS.
No. 478,991. Patented July 19, 1892.
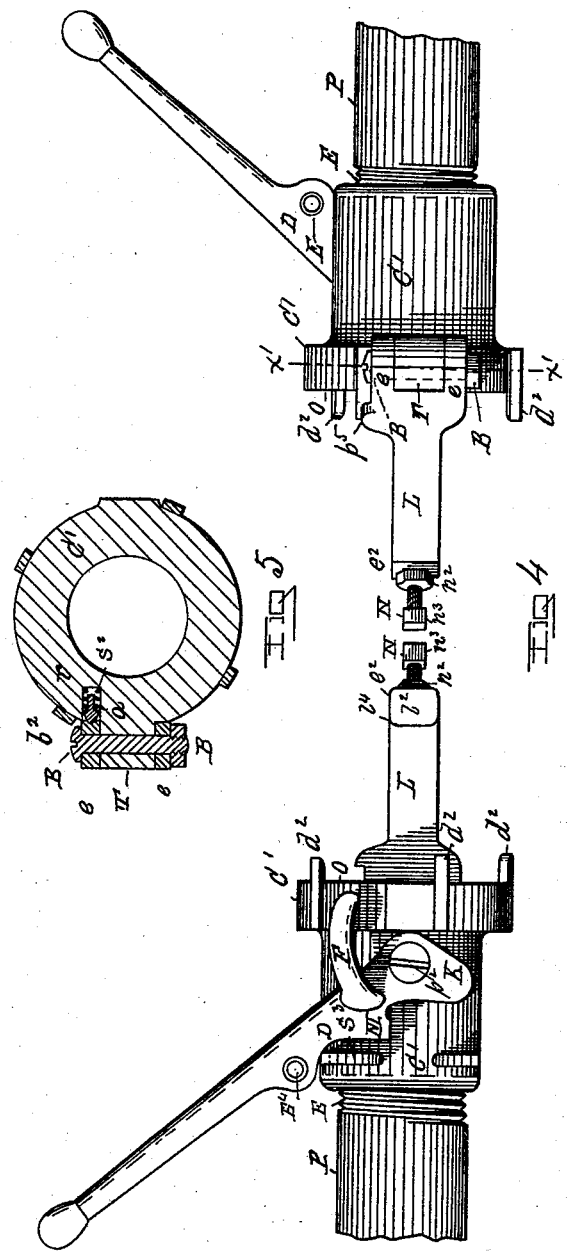
WITNESSES
William A. Sweet
Charles D. Brintnall
INVENTOR
Thomas Curley
by W E Hagan atty

UNITED STATES PATENT OFFICE.

THOMAS CURLEY, OF TROY, NEW YORK.

STEAM-PIPE COUPLING FOR RAILWAY-CARS.

SPECIFICATION forming part of Letters Patent No. 478,991, dated July 19, 1892.

Application filed July 18, 1891. Serial No. 399,987. (No model.)

*To all whom it may concern:*

Be it known that I, THOMAS CURLEY, of the city of Troy, county of Rensselaer, and State of New York, have invented a new and useful Improvement in Couplers for the Steam-Heating Pipes of Railway-Cars, of which the following is a specification.

My invention relates to improvements in apparatus for connecting the steam-heating pipes of railroad-trains, and these improvements have for their object an improved arrangement of apparatus for connecting the pipes between the cars.

Accompanying this specification to form a part of it there are three plates of drawings, containing five figures, illustrating my invention, with the same designation of parts by letter reference used in all of them.

Of the illustrations, Figure 1 is a side elevation showing the two ends of a car steam-heating pipe connected by my two-part coupler. Fig. 2 shows a top view of the two coupler parts on the abutting ends of two steam-pipes with the coupler parts shown as connected. Fig. 3 is a top view of the parts shown at Figs. 1 and 2 with the coupler parts shown as separated. Fig. 4 shows a side elevation of the two coupler parts and part of the steam-pipe with which they each connect with the coupler parts shown as separated. Fig. 5 shows a section taken on the line $x'$ $x'$ of Fig. 4.

The several parts of the coupler mechanism thus illustrated are designated by letter reference, and the function of the parts is described as follows:

The letters P designate the steam-pipes extending from the ends of the cars, and C′ C′ the coupler parts, each of which is the counterpart of the other and each of which at its outer end E is connected with one of the steam-pipes P. Each of the coupler parts is made with an abutting packing-face O, provided with packing $p'$, so that when brought together to face on each other they make a steam-tight connection thereat.

The letters L designate a latch, of which there is one hinged to the side of each coupler part by means of hinging ears $e\,e$, made on the latch, and a hinging-tongue T, projected from the coupler parts upon opposite sides of the latter. Each of these tongues T is entered between the ears $e\,e$ of each of the said latches and secured therein by means of a hinging-bolt B. Each of these latches is made with a cam $c^2$, arranged upon one of its ears $e$, and the letter $b^2$ designates a spring-bolt having an encircling spring $S^2$, made to surround said bolt B within a recess $r$ in each of the coupler body parts, one end of said spring connecting with the bolt B at $a$ and the other end thereof resting on the bottom of said recess, as shown at Fig. 5, and so that when said latch is moved to lock, as will be hereinafter described, it is so moved that the cam thereon bears against the force of said spring-bolt, and which latter operates to throw outwardly the outer end of the latch on its hinged connection when the latch is relieved. Each of these latches is made with a projection $p^5$ on its upper edge that tapers downwardly as extended outwardly, the function of which will be subsequently described herein. Each of these latches L has upon its outer end $e^2$ an L-form termination upon its inner side, as indicated at $l^2$. This L-form end is produced by the end $l^3$, projected inwardly at right angles to the latch proper, and lip $l^4$, projected toward the hinged end of the latch, but at right angles to the outer end $l^3$ so as to inclose a recess $l^7$.

The letter N designates a set-screw constructed to turn in the end of each of the latches, the inner end of said set-screw passing through the end $l^3$ of the latches. This set-screw is provided with a keeper-nut $n^2$ and a head-nut $n^3$, the latches as thus constructed and hinged being shown in a top view at Fig. 3 as disconnected and thrown out by the action of the spring-bolts, with the coupler parts illustrated in a top view as connected at Fig. 3 and as disconnected in a side view at Fig. 4.

The letter D designates latching-levers, of which there is one for each coupler part. Each of these levers is pivoted to one of the coupler parts upon the opposite side of each of the latter, as indicated at $p^2$, as shown at Fig. 4. Each of these levers D is constructed with a curved finger F, that is rigidly attached to the outer face of each of said levers, as indicated at Figs. 1, 3, and 4, and each of these fingers is so curved outwardly and downwardly that when the two coupler parts are brought face to face on their packing-faces O and the levers are moved downwardly the fingers F of each coupler part will engage with the rounded projection $p^5$ on the edge of and as descending along the face thereof with the outer face of each of the latches L, so as to force inwardly the outer ends of the same and into the position shown at Figs. 1 and 2.

The letters K designate a cam made on the pivot end of each of the levers D, and when these levers are turned on their pivoted connections they operate, as before described, to swing in the outer ends of the latches L by means of the fingers F, and as these levers continue to descend the cam K on each of them engages with the recess $l^7$ or the end of the set-screw N of the latch end of the other coupler, thus operating to pull the two coupler parts toward each other on their bearing-faces O.

The letters $d^2$ designate guides arranged on each of the coupler parts, which are made on the outer face thereof, so as to break joints when the coupler parts connect and so that each of them will lap past each other and outer face of the other coupler part when the bearing-faces of the coupler parts are drawn together by the combined action of the latches L and pivoted levers D, as before described.

The letters M designate wedge-formed lugs projected from the levers D, and the function of these wedge-formed lugs is, when the levers D are operated, to disconnect the coupler parts. These wedges, as the levers are pulled back, crowd in between the latches and coupler sides to disconnect them, so as to be acted upon by the springs, which force their L-form ends outwardly.

The letters $S^3$ designate stops made on each of the coupler parts to regulate their unlatching movement, and the letters $E^4$ designate eyes made in each of the levers D for making a connection by means of a chain with the end of the car located oppositely, so that as the cars separate the coupler will automatically disconnect. As thus made and arranged, these coupler parts are adapted to disconnect automatically and to be easily connected when the abutting ends of the cars are brought together and to make a perfectly-tight joint thereat.

Having thus described my invention, what I claim, and desire to secure by Letters Patent, is—

The combination of the two coupler parts C' C', each having the packing-face O and packing $p'$ and each made with a hinged latch L, constructed with an end recess $l^7$, and each of said coupler parts constructed with a pivoted lever D, made with the finger F, and cam K, constructed and arranged to operate connectedly, substantially in the manner as and for the purposes set forth.

Signed at Troy, New York, this 30th day of December, 1890, and in the presence of the two witnesses whose names are hereunto written.

THOMAS CURLEY.

Witnesses:
CHARLES S. BRINTNALL,
W. E. HAGAN.